US009439536B2

(12) United States Patent
Blomberg

(10) Patent No.: US 9,439,536 B2
(45) Date of Patent: Sep. 13, 2016

(54) BARBEQUE GRILL AND OVEN

(71) Applicant: Jim Blomberg, Loomis, CA (US)

(72) Inventor: Jim Blomberg, Loomis, CA (US)

( * ) Notice: Subject to any disclaimer, the term of this patent is extended or adjusted under 35 U.S.C. 154(b) by 440 days.

(21) Appl. No.: 13/853,848

(22) Filed: Mar. 29, 2013

(65) Prior Publication Data
US 2014/0290497 A1 Oct. 2, 2014

(51) Int. Cl.
*A47J 37/07* (2006.01)
*A23B 4/052* (2006.01)

(52) U.S. Cl.
CPC .......... *A47J 37/0704* (2013.01); *A23B 4/0523* (2013.01); *A47J 37/0786* (2013.01)

(58) Field of Classification Search
CPC .............. A23B 4/0523; A47J 37/0704; A47J 37/0786
USPC ......... 99/324, 339, 340, 401, 444, 446, 447, 99/448, 449, 450, 467, 468, 477, 480, 481; 99/482; 126/1 R, 9 R, 19 R, 21 R, 21 A, 25 R, 126/29, 30, 38, 39 R, 41 R, 273 R, 275 R
See application file for complete search history.

(56) References Cited

U.S. PATENT DOCUMENTS

| | | | |
|---|---|---|---|
| 2,746,377 A * | 5/1956 | Parks ...................... 99/421 HV |
| 4,233,890 A * | 11/1980 | Jansen ..................... A47J 37/07 126/25 R |
| 4,664,026 A | 5/1987 | Milloy | |
| 4,700,618 A | 10/1987 | Cox | |
| 4,850,333 A | 7/1989 | Dellrud | |
| 4,934,260 A | 6/1990 | Blevins | |
| 5,195,423 A * | 3/1993 | Beller ............................. 99/340 |
| 5,437,222 A | 8/1995 | Franklin | |
| 5,653,162 A | 8/1997 | Lunde | |
| 5,865,099 A | 2/1999 | Waugh | |
| 6,102,028 A | 8/2000 | Schlosser | |
| 6,142,066 A | 11/2000 | Anders | |
| 6,820,538 B2 | 11/2004 | Roescher | |
| 7,004,063 B1 * | 2/2006 | Li ...................... A47J 37/0704 126/25 R |
| 7,159,509 B2 | 1/2007 | Starkey | |
| 7,624,675 B2 | 12/2009 | Galdamez | |
| 8,092,850 B2 | 1/2012 | Marr | |

(Continued)

FOREIGN PATENT DOCUMENTS

DE 20303004 * 7/2003
WO WO/2012/120553 A1 9/2012

OTHER PUBLICATIONS

H000813; U.S. Statutory Invention Registration, publ. Sep. 4, 1990, Combined Smoker/Cooker Unit, Ragon.

*Primary Examiner* — Dana Ross
*Assistant Examiner* — Joseph Iskra
(74) *Attorney, Agent, or Firm* — Inventive Patent Law P.C.; Jim H. Salter

(57) ABSTRACT

A barbeque grill and oven or food smoker having an offset firebox configuration is disclosed. Example embodiments include: an oven having an enclosed interior region for cooking food items; an offset firebox sharing at least a portion of a side of the oven, the offset firebox having a first opening over which a removable grill may be placed, the firebox having a second opening through which airflow may travel from the firebox into the oven; and an oven lid configured to produce an opening in the top of the oven of any desired site the opening of the oven lid causing an increase in the flow of heated an from the firebox into the oven.

7 Claims, 10 Drawing Sheets

(56) References Cited

U.S. PATENT DOCUMENTS

| | | | |
|---|---|---|---|
| 8,122,818 B2* | 2/2012 | Oberlander et al. | 99/481 |
| 2003/0150336 A1* | 8/2003 | Roescher | A23L 1/0135 99/340 |
| 2004/0237801 A1* | 12/2004 | Starkey | 99/482 |
| 2006/0254433 A1* | 11/2006 | Oberlander et al. | 99/448 |
| 2007/0028914 A1* | 2/2007 | Galdamez | 126/29 |
| 2008/0098902 A1 | 5/2008 | Mansfield | |
| 2008/0098906 A1* | 5/2008 | Davis | 99/482 |
| 2008/0168979 A1* | 7/2008 | Goehring | A47J 37/0786 126/25 R |
| 2009/0314285 A1* | 12/2009 | Marsh | A47J 37/0763 126/9 R |
| 2010/0263654 A1* | 10/2010 | Cusack | 126/25 R |
| 2012/0012096 A1* | 1/2012 | Cusack | 126/312 |
| 2014/0007778 A1* | 1/2014 | Marks et al. | 99/339 |
| 2014/0290497 A1* | 10/2014 | Blomberg | 99/339 |

* cited by examiner

BARBEQUE GRILL AND OVEN

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the disclosure herein and to the drawings that form a part of this document: Copyright 2012-2011, Jim Blomberg, All Rights Reserved.

BACKGROUND

1. Technical Field

This disclosure relates to barbeques ovens, smokers, or food cooking assemblies, and more specifically to a combination barbeque grill and oven or food smoker having an offset firebox configuration.

2. Related Art

Barbeque grills or grilling assemblies are popular devices for cooking meats, fish, vegetables, or the like. Similarly, fire-heated ovens or smokers are popular devices for slowly cooking food and infusing the cooked food with a desired smoky flavor. However, the configuration of most available grills with food smokers disadvantageously causes uneven smoking and cooking of food on the grill or within the smoker, thus making their use inefficient, impractical and problematic. As a result, operators of such grills are often forced to either continually rotate their meats to ensure even cooking and smoking thereof, or to cook their meats within a central area on the grilling grate or the smoking chamber where cooking temperature is more acceptable, thereby significantly reducing otherwise useable grill space. Additionally, conventional systems cannot be conveniently configured to adjust the temperature in the cooking area to a desired level. Therefore, there is as need for a combination grill and food smoker that provides a configurable and consistent dispersion of heat and smoke throughout the cooking area of the grill and the smoker.

BRIEF DESCRIPTION OF THE DRAWINGS

Embodiments illustrated by way of example and not limitation in the figures of the accompanying drawings, in which.

DETAILED DESCRIPTION

A barbeque grill and oven or food smoker having an offset firebox configuration is disclosed. However, it is understood that embodiments may be practiced without these specific details. In other instances, well-known processes, structures and techniques have not been shown in detail in order not to obscure the clarity of this description. Various embodiments are described below in connection with the figures provided herein.

Description of an Example Embodiment

Figure 1:
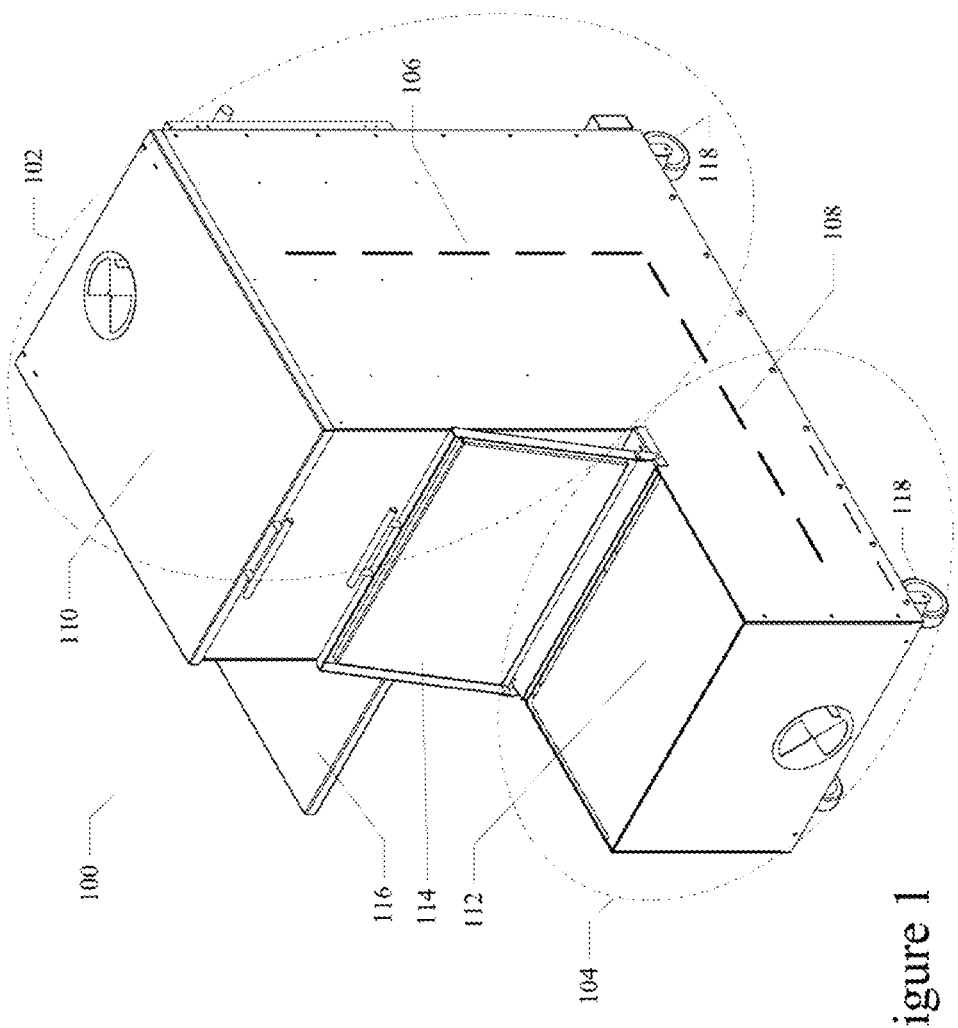
FIG. 1 illustrates a front perspective view of an example embodiment with the oven lid in a closed position.

In the various embodiments described herein, a barbeque grill and oven or food smoker having an offset firebox configuration is provided. Referring now to FIG. 1, a particular embodiment 100 of the barbeque grill and oven or food smoker having an offset firebox configuration is illustrated. FIG. 1 illustrates a front perspective view of an example embodiment of the barbeque grill and oven 100 with the oven lid in a closed position. In general, the barbeque grill and oven 100 of an example embodiment comprises a mainly vertical oven or smoker portion 102 and a mainly horizontal grill and firebox portion 104. As shown in FIG. 1, the mainly vertical oven or smoker portion 102 is configured as a generally rectangular enclosure extending predominantly in a vertical direction as indicated by the vertical axis 106. As also shown in FIG. 1, the mainly horizontal grill and firebox portion 104 is configured as a generally rectangular enclosure extending predominantly in a horizontal direction as indicated by the horizontal axis 108. As such, the grill and firebox portion 104 can be considered offset from the vertical axis of the oven or smoker portion 102. In one example embodiment, the grill and firebox portion 104 can share at least a portion of a side of the oven or smoker portion 102, the offset grill and firebox portion 104 having a first opening over which a removable grill or grate may be placed, the grill and firebox portion 104 having as second opening through which airflow may travel from the grill and firebox portion 104 into the oven or smoker portion 102. When in use, as described in more detail below, the oven or smoker portion 102 provides an area or interior region in which food items can be arranged on one or more grills or hung from hooks and exposed to heat provided by a tire in a firebox of the grill and firebox portion 104. As such, the oven or smoker portion 102 provides an enclosure or enclosed interior region that can be used to bake, slow-cook, or smoke food items. For brevity, this enclosure will be denoted herein as the oven 102. The oven 102 includes an oven lid 110, which can be slid horizontally to expose the oven 102 to outside air. The oven lid 110 can be slid horizontally to any desired position to produce an opening in the top of the oven 102 of any desired size. As will be described in more detail below, this configurably sized opening in the top of the oven 102 can be used to configure the temperature in the oven 102 enclosure.

Referring still to FIG. 1, the grill and firebox portion 104 of the barbeque grill and oven 100 of an example embodiment includes a firebox 112 that provides a generally rectangular enclosure in which a fire can be started using wood, briquettes, pellets, or other types of fuels typically used in barbeques. In an alternative embodiment, propane gas can be used as a fuel source for the fire in the firebox 112. The grill and firebox portion 104 can also include as grill or grate 140 (see FIG. 10) that can be removably placed over the fire in the firebox 112. The grill 140 over the fire in the firebox 112 provides a heat-permeable surface that can be used to fry, sear, broil, grill, or fast-cook and items. In the example embodiment, the grill and firebox portion 104 can also include a grill cover 114 to cover the grill 140 and firebox 112 when the barbeque grill and oven 100 is not in use. In the example embodiment, the barbeque grill and oven 100 can include a foldable utility shelf 116 and wheels or rollers 118 to facilitate movement of the barbeque grill and oven 100.

Figure 2:
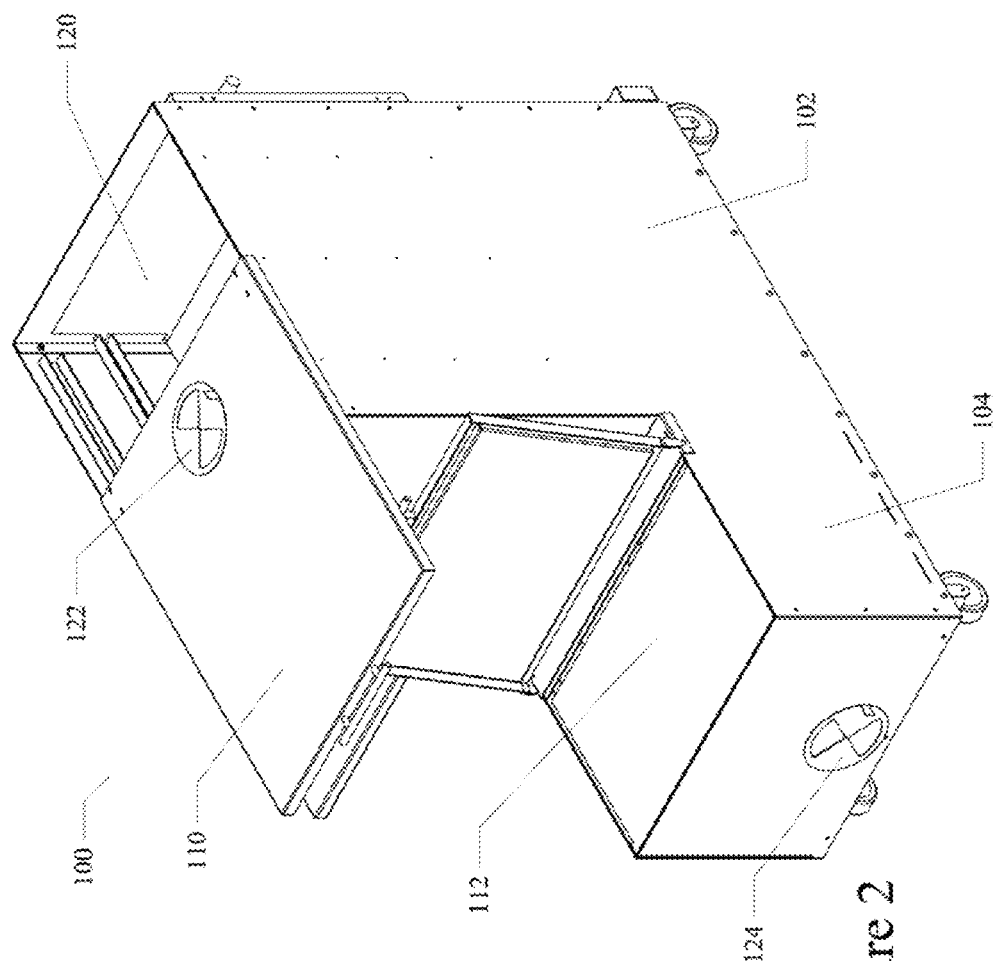
FIG. 2 illustrates a front perspective view of an example embodiment with the oven lid in an open position.

FIG. 2 illustrates a front perspective view of an example embodiment with the oven lid 110 in an open position. As a result of the oven lid 110 being slid to an open position as shown in FIG. 2, an opening 120 in the top of the oven 102 is produced. Depending on the distance that the oven lid 110 is horizontally slid, the size of the opening 120 can be configurably adjusted. The oven lid 110 can also be configured to include an adjustable vent opening 122 that can be opened or closed independently of the position of the oven lid 110. As a result, the features of the oven lid 110 provide a means for adjusting the quantity of air that can escape from the top of the oven 102. Additionally, the grill and firebox portion 104 can be configured to include an adjustable vent opening 124 that can be opened or closed to provide a means for adjusting the quantity of air that can enter the firebox 112. The opening on the top of the firebox 112 also provides a means for outside air to enter the firebox 112 and feed the fire therein. Additionally, opening on the top of the firebox 112 provides a means for outside air to enter the firebox 112 and flow through to the oven 102 via an opening between the firebox 112 and the oven 102, if the oven lid 110 is open or the vent 122 is open. As described in more detail below, this airflow between the firebox 112 and the oven 102 enables the heat generated in the firebox 112 to be configurably transferred to the oven 102.

Figure 3:
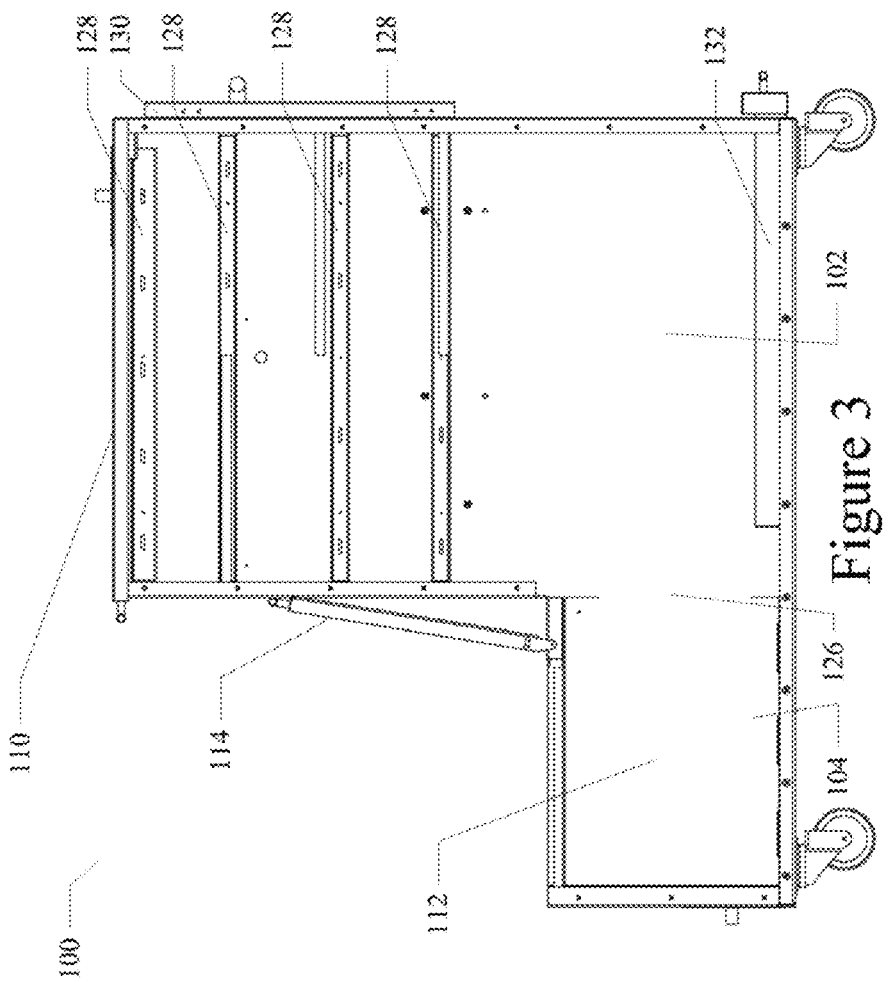
FIG. 3 illustrates a side it of an example embodiment with the oven lid in a closed position and the near side of the barbeque grill and oven rendered transparently.

FIG. 3 illustrates a side view of an example embodiment with the oven lid in a closed position and the near side of the barbeque grill and oven 100 rendered transparently. As shown, an opening 120 between the firebox 112 and the oven 102 provides a means for airflow between the firebox 112 and the oven 102, if the oven lid 110 is open or the vent 122 is open. FIG. 3 also shows the rack supports 128, which can be used to support one or more removable grills, grates, or racks in the interior enclosure of the oven 102. The removable grills, grates, or racks can be used to place food items thereon, which can be cooked or smoked in the oven 102. These rack supports 128 can also be used to support hangars, which can be used to hang food items from hooks within the interior enclosure of the oven 102. A door 130 is also provided to enable access to the interior of the oven 102 from the rear of the oven 102. In one embodiment, the door 130 is hinged at the lower edge to enable the door 130 to open outwardly and downwardly. A trap drawer 132 is provided at the bottom of the oven 102 to catch drippings and the like that may drop from food items cooking in the oven 102. The trap drawer 132 can be slid outwardly and removed for emptying.

Figure 4:
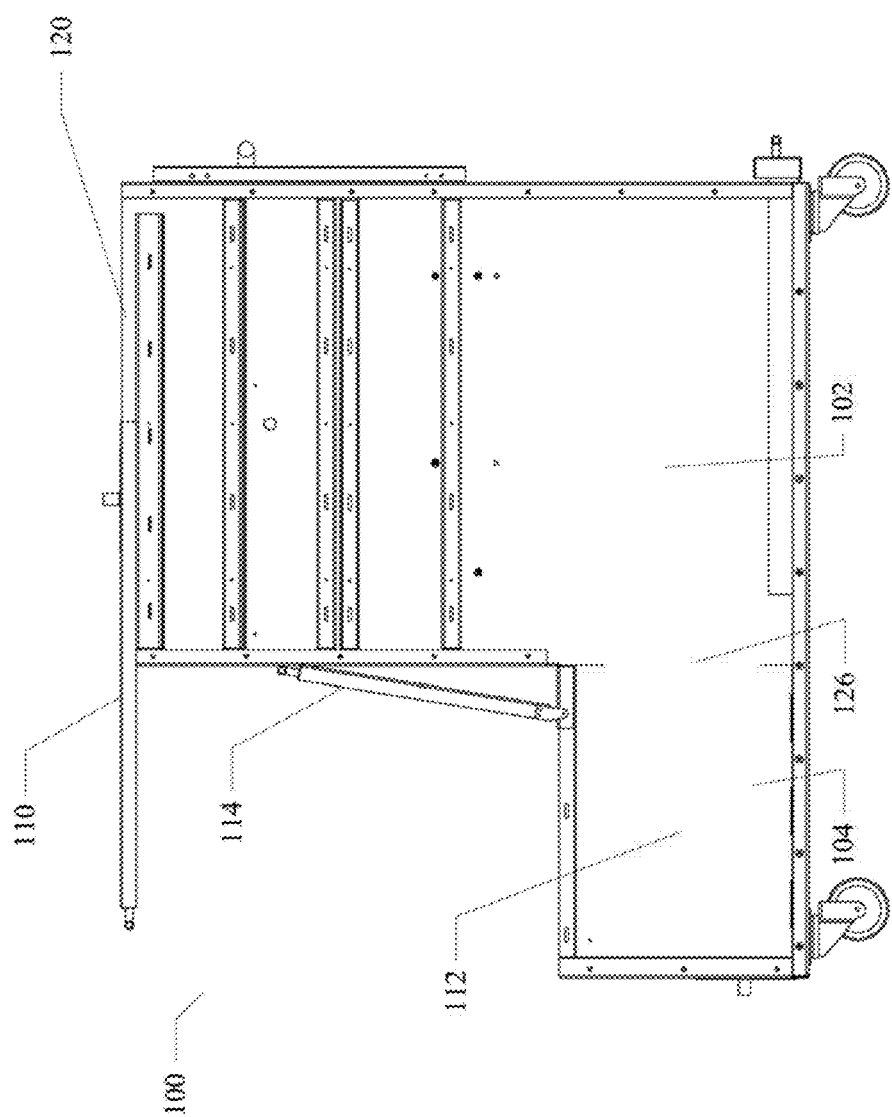
FIG. 4 illustrates a side view of an example embodiment with the oven lid in an open position and the near side of the barbeque grill and oven rendered transparently.

FIG. 4 illustrates a side view of an example embodiment with the oven lid in an open position and the near side of the barbeque grill and oven 100 rendered transparently. As shown, an opening 126 between the firebox 112 and the oven 102 provides a means for airflow between the firebox 112 and the oven 102, if the oven lid 110 is open or the vent 122 is open. Given the open oven lid 110 shown in FIG. 4, an opening 120 in the top of the oven 102 is produced. As a result, air and heat can flow from the firebox 112, through the opening 126, into the oven 102 and out of the oven 102 through the opening 120. Depending on the distance that the oven lid 110 is horizontally slid, the size of the opening 120 can be configurably adjusted and thus the quantity of the air flow into the oven 102 can be configurably adjusted. Additional details of the airflow features of the example embodiment are provided below in connection with FIGS. 7 and 8.

Figure 5:
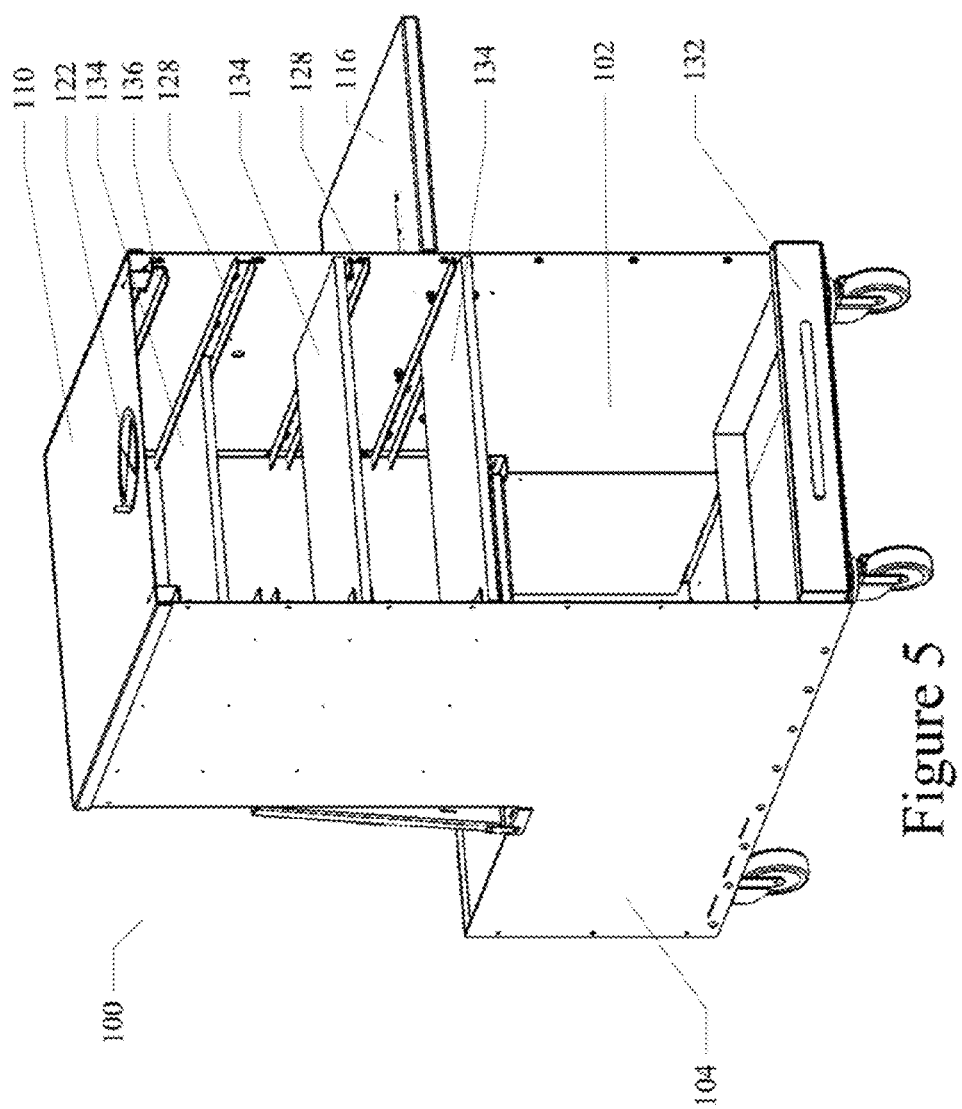
FIG. 5 illustrates a rear perspective view of an example embodiment with the oven lid in a closed position and the rear side of the barbeque grill and overt rendered transparently.

FIG. 5 illustrates a rear perspective view of an example embodiment with the oven lid 110 in a closed position and the rear side of the barbeque grill and oven 100 rendered transparently. The enclosure within oven 102 is shown to include the rack supports 128, which can be used to support one or more removable grills, grates, or racks 134 in the interior enclosure of the oven 102. In an alternative embodiment, the rack supports 128 can also be used to support hangars, which can be used to hang food items from hooks within the interior enclosure of the oven 102. In this case, the removable grills, grates, or racks 134 can be removed to make room for the hanging food items. In another configuration, a portion of the interior of the oven 102 can be used for hanging food items while another portion can be used with removable grills, grates, or racks 134. As a result, the oven 102 can support a wide variety of food items that can be cooked at the same time. The enclosure within oven 102 is also shown to include the lid slide supports 136, which can be used to support the oven lid 110 and to enable the oven lid 110 to be slid horizontally to expose opening 120, as shown in FIG. 6.

Figure 6:
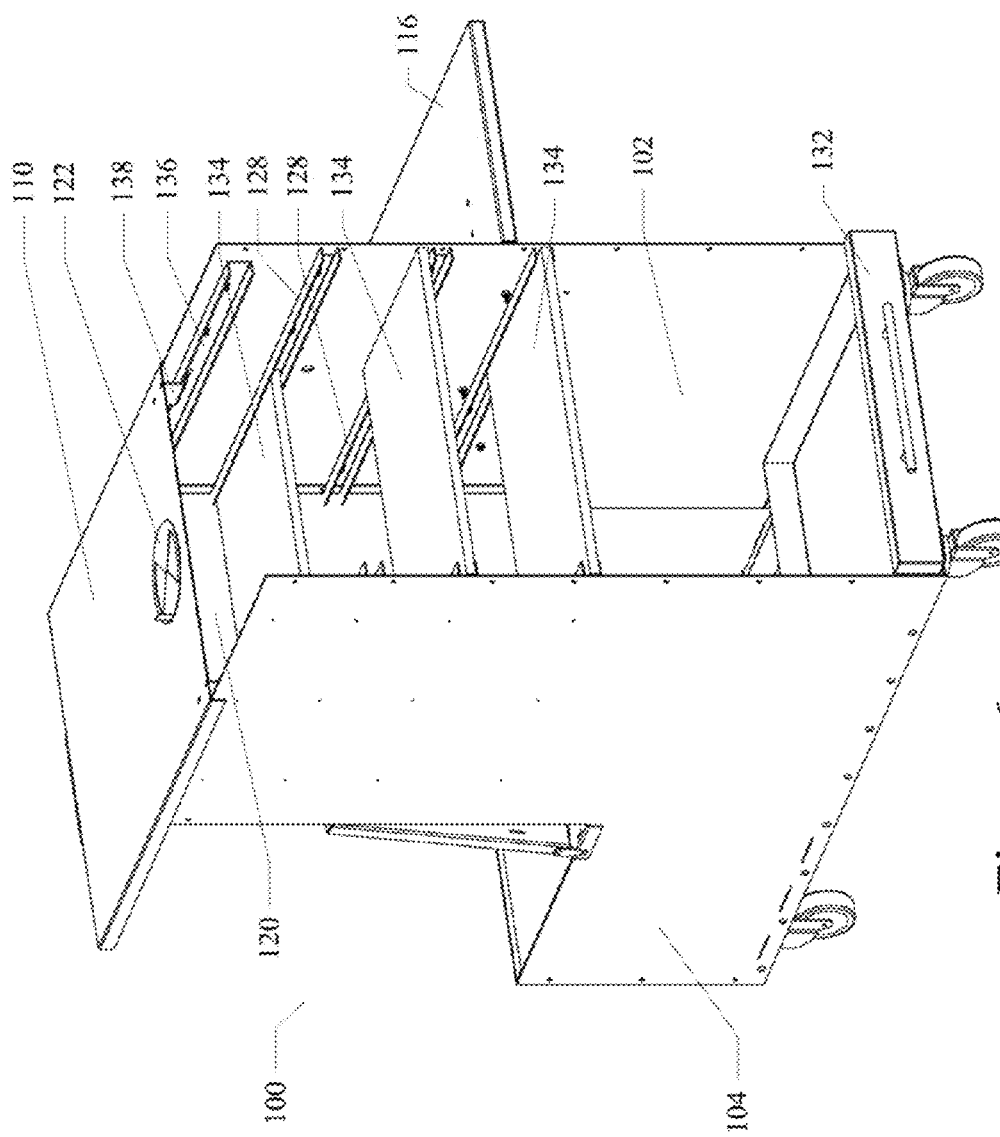
FIG. 6 illustrates a rear perspective view of an example embodiment with the oven lid in an open position and the rear side of the barbeque grill and oven rendered transparently.

FIG. 6 illustrates as rear perspective view of an example embodiment with the oven lid 110 in an open position and the rear side of the barbeque grill and oven 100 rendered transparently. As shown, the oven lid 110 has been slid horizontally along lid slide supports 136 to expose opening 120. A bracket 138 is provided on the underside of the oven lid 110 to engage the lid slide supports 136 and to enable the sliding of the oven lid 110 horizontally along lid slide supports 136.

Figure 7:
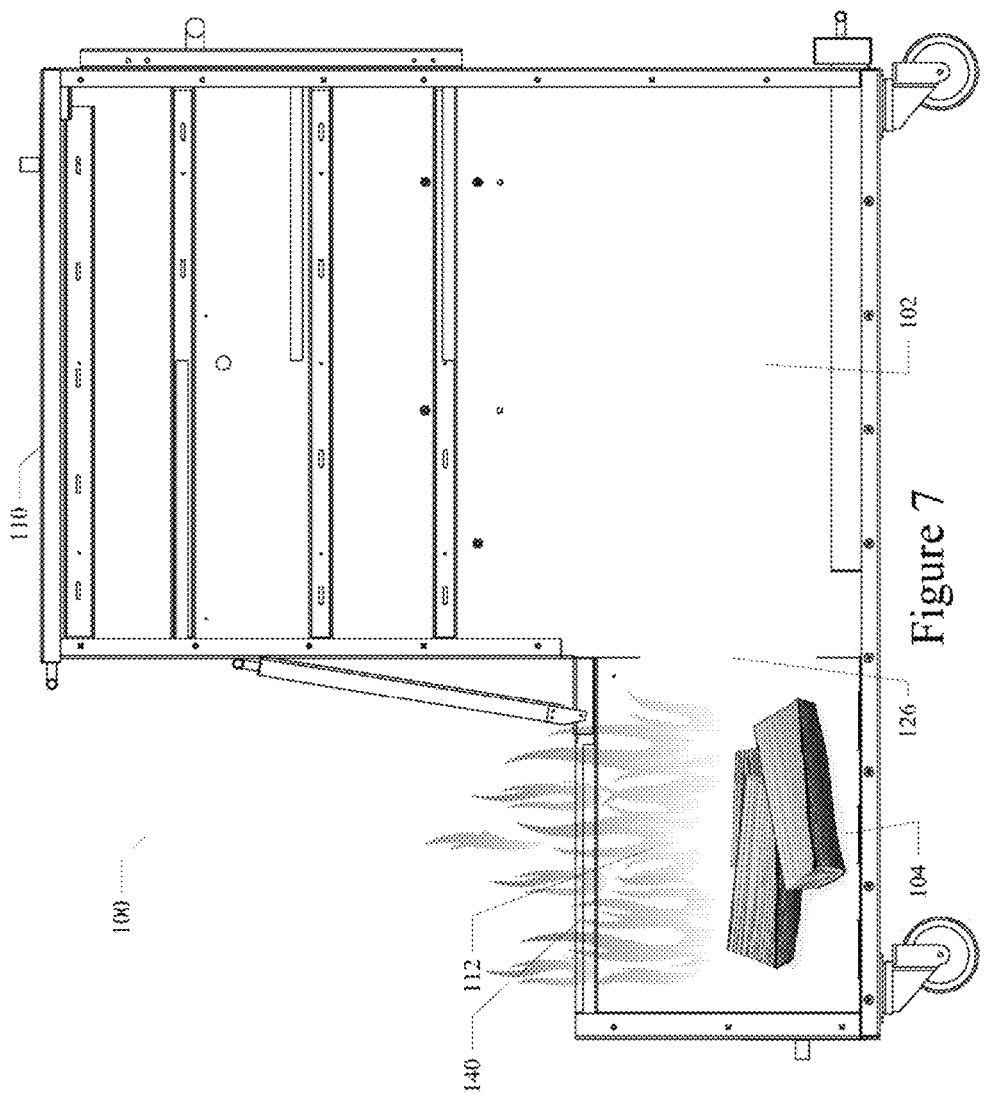
FIG. 7 illustrates a side view of an example embodiment with the oven lid in a closed position, the near side of the barbeque grill and oven rendered transparently, and a fire in the offset firebox wherein air flow through the oven is disabled.

FIG. 7 illustrates a side view of an example embodiment with the oven lid 110 in a closed position, the near side of the barbeque grill and oven 100 rendered transparently, and a fire in the offset firebox 112 wherein air flow through the oven 102 is disabled. As shown in FIG. 7, the fire in the offset firebox 112 generates as heated convection airflow extending outwardly as result of the heat produced by the fire. Some of this heated airflow can travel into the oven 102 via the opening 126 between the firebox 112 and the oven 102. However, a minimal amount of this heated airflow travels into the oven 102, because the oven 102 is a closed space when the oven lid 110 is closed and the vent 122 is closed. As a result, when the oven lid 110 is closed and the vent 122 is closed, most of the heat generated by the firebox 112 escapes through the open top of the firebox 112 and the grill 140 resting thereon. Thus, when a user wants to grill food items on the grill 140 spanning the open top of the firebox 112, the oven lid 110 can be closed and the vent 122 can be closed to render a maximum amount of heat at the grill 140. In this configuration, the enclosure within the oven 102 is subjected to a minimal level of heat from the fire in firebox 112. This low level of heat may be beneficial for slow-cooking or smoking food items positioned in the oven 102.

Figure 8:
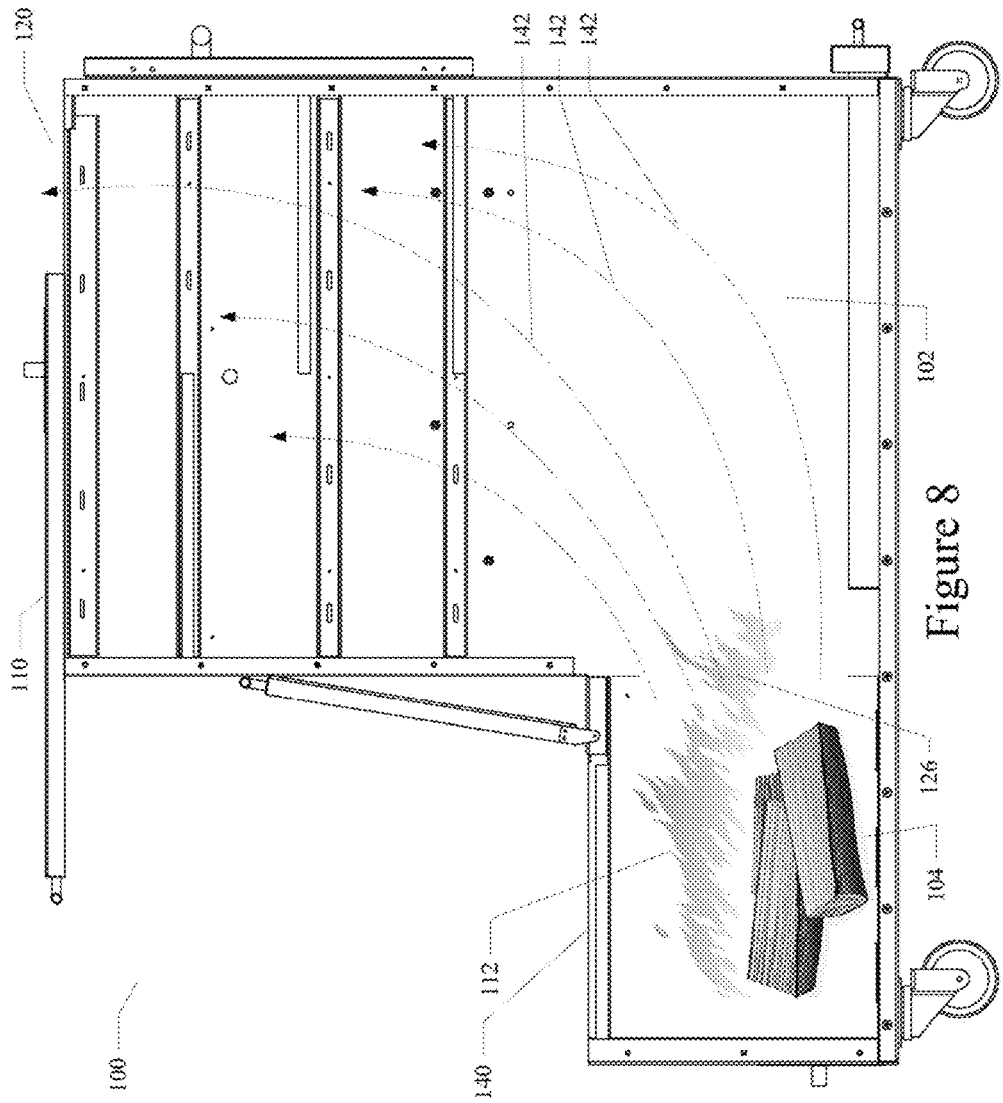
FIG. 8 illustrates a side view of an example embodiment with the oven lid in an open position, the near side of the barbeque grill and oven rendered transparently, and a fire in the offset firebox wherein air flow through the oven is enabled.

FIG. 8 illustrates a side view of an example embodiment with the oven lid 110 in an open position, the near side of the barbeque grill and oven 100 rendered transparently, and a fire in the offset firebox 112 wherein air flow through the oven 102 is enabled. In the configuration of the barbeque grill and oven 100 shown in FIG. 8, the oven lid 110 and/or the vent 122 is in an open position. As a result, the heated airflow generated by the fire in the firebox 112 can travel readily into the oven 102 via the opening 126 between the firebox 112 and the oven 102 as shown by the dashed lines 142. Because the oven 102 is no longer a closed space when the oven lid 110 is open or the vent 122 is open, the heated airflow can travel into and through the interior of the oven 102 and out of the oven 102 via the opening 120. As a result, the interior of the oven 102 heats up and the temperature at the grill 140 is reduced. If the oven lid 110 and/or the vent 122 are configured to only a slightly open position, the airflow into the oven 102 is reduced and the temperature in the oven is correspondingly reduced. Conversely, if the oven lid 110 and/or the vent 122 are configured to a widely open position, the airflow into the oven 102 is increased and the temperature in the oven is correspondingly increased. In contrast, the temperature at the grill 140 is reduced if the oven lid 110 and/or the vent 122 are configured to a widely open position. The temperature at the grill 140 is increased if the oven lid 110 and/or the vent 122 are configured to a closed or a slightly open position. Thus, the movement of the oven lid 110 can be used to configure the temperature in the oven 102 and at the grill 140 at the same time. As described above, the grill and firebox portion 104 can be configured to include an adjustable vent opening 124 that can be opened or closed to provide a further means for adjusting the quantity of air that can enter the firebox 112 and flow into the oven 102. The opening on the top of the firebox 112 also provides a means for outside air to enter the firebox 112 and feed the fire therein. The opening on the top of the firebox 112 also provides a means for outside air to enter the firebox 112 and flow through to the oven 102 via the opening 126 between the firebox 112 and the oven 102, if the oven lid 110 is open or the vent 122 is open. As described herein, this heated airflow between the firebox 112 and the oven 102 enables the heat generated in the firebox 112 to be configurably transferred to the oven 102 and a desired cooking temperature to be achieved in the oven 102 and at the grill 140 by the operation of a few control features of the barbeque grill and oven 100 of an example embodiment as described herein. As a result, the operation of a few control features of the barbeque grill and oven 100 enables control of the size of the opening on the top of the oven 102 and the flow of heated air through the barbeque grill and oven 100. Thus, these control features allow a user to control the cooking temperature achieved in the oven 102. By controlling the cooking temperature achieved in the oven 102, the user can cook, bake, smoke, or heat a variety of food items in the oven 102. Additionally, these control features allow a user to control the cooking temperature achieved at the grill 140. By controlling the cooking temperature achieved at the grill 140, the user can sear meat or other food items directly over a fire below grill 140 that without the described control features would burn the food items. In other words, the described control features, with their ability to redirect the flames and heated air into the oven 102, allow a user to sear food items on the grill 140, which would otherwise burn. These features of the barbeque grill and oven 100 of an example embodiment as described herein enable a user to achieve a level of control over the cooking conditions in the oven and grill that existing systems do not provide.

Figure 9:
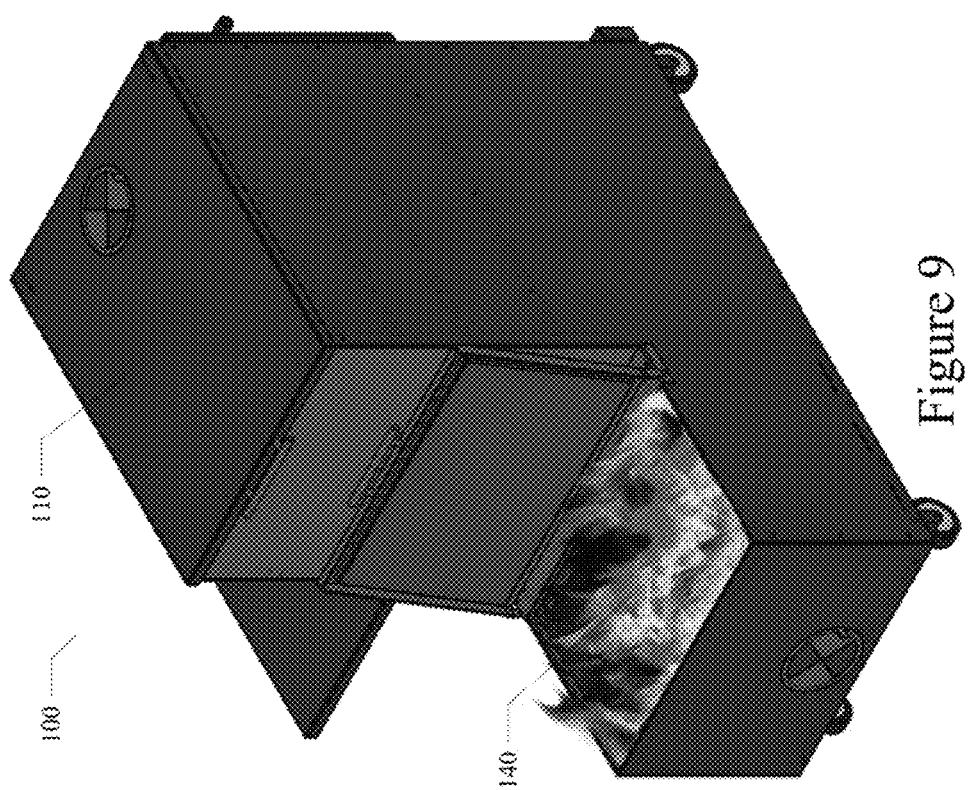
FIG. 9 illustrates a front perspective view of an example embodiment with the oven lid in a closed position and a fire in the offset firebox wherein air flow through the oven is disabled.

FIG. 9 illustrates a front perspective view of an example embodiment with the oven lid 110 in a closed position and a fire in the offset firebox 112 wherein air flow through the oven 102 is disabled. In the configuration shown in FIG. 9, a maximal cooking temperature is achieved at the grill 140 and a minimal cooking temperature is achieved in the oven 102; because the oven lid 110 is in a closed position and air flow through the oven 102 is disabled.

Figure 10:
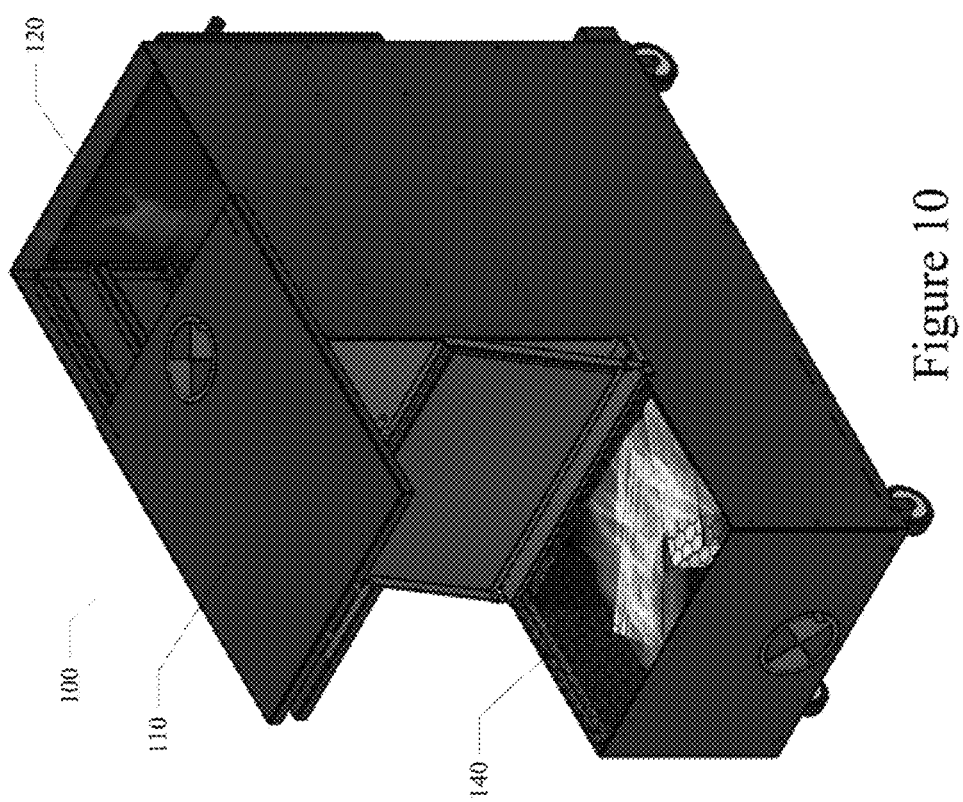
FIG. 10 illustrates a front perspective view of an example embodiment with the oven lid in an open position and a fire in the offset firebox wherein air flow through the oven is enabled.

FIG. 10 illustrates a front perspective view of an example embodiment with the oven lid 110 in an open position and a fire in the offset firebox 112 wherein air flow through the oven 102 is enabled. In the configuration shown in FIG. 10, a maximal cooking temperature is achieved in the oven 102 and a minimal cooking temperature is achieved at the grill 140; because the oven lid 110 is in an open position and air flow through the oven 102 is enabled.

In an example embodiment, the components of the barbeque grill and oven 100 can be fabricated from A36 hot rolled steel of as standard thickness and composition. The seams between panels can be welded. The rack supports and other attachable components can be stitch welded or attached using zinc-plated nuts and bolts. The components of the barbeque grill and oven 100 can be fabricated to be assembled on-site. The particular materials can be selected for a particular application based on a variety of factors including the desired size, temperature ranges, ambient weather, and the like.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of ordinary skill in the an upon reviewing the above description. Other embodiments may be utilized and derived therefrom, such that structural and logical substitutions and changes may be made without departing from the scope of this disclosure. The figures provided, herein are merely representational and may not be drawn to scale. Certain proportions thereof may be exaggerated, while others may be minimized. Accordingly, the specification and drawings are to be regarded in an illustrative rather than a restrictive sense.

The description herein may include terms, such as "up", "down", "upper", "lower", "first", "second", etc. that are used for descriptive purposes only and are not to be construed as limiting. The elements, materials, geometries, dimensions, and sequence operations may all be varied to suit particular applications. Parts of some embodiments may be included in, or substituted for, those of other embodiments. While the foregoing examples of dimensions and ranges are considered typical, the various embodiments are not limited to such dimensions or ranges.

The Abstract is provided to comply with 37 C.F.R. §1.74(b) to allow the reader to quickly ascertain the nature and gist of the technical disclosure. The Abstract is submitted with the understanding that it will not be used to interpret or limit the scope or meaning of the claims.

In the foregoing Detailed Description, various features are grouped together in as single embodiment for the purpose of streamlining the disclosure. This method of disclosure is not to be interpreted as reflecting an intention that the claimed embodiments have more features than are expressly recited in each claim. Thus, the following claims are hereby incorporated into the Detailed Description, with each claim standing on its own as a separate embodiment.

Thus, a barbeque grill and oven or food smoker having an offset firebox configuration is disclosed. While the present invention has been described in terms of several example embodiments, those of ordinary skill in the art can recognize that the present invention is not limited to the embodiments described, but can be practiced with modification and alteration within the spirit and scope of the appended claims. The description herein is thus to be regarded as illustrative instead of limiting.

What is claimed is:

1. An apparatus comprising:
    an oven having a first enclosed interior region for cooking food items, the first enclosed interior region being defined by four vertical oven sides joined at edges of each vertical oven side, a first vertical oven side including a single fixed size air inlet at a lower portion of the first vertical oven side, the size of the air inlet at the lower portion of the first vertical oven side not being adjustable, a second vertical oven side including a door hinged at a lower edge to enable the door to open outwardly and downwardly for access to the first enclosed interior region, the second vertical oven side further including a trap drawer at a lower portion of the second vertical oven side, the trap drawer including a first slide mechanism to enable the trap drawer to slide horizontally out from the second vertical oven side for access to a grease trap in the trap drawer, the oven having a first opening at the top of the first enclosed interior region;
    an offset firebox having a second enclosed interior region for containing a fire, the second enclosed interior region being defined by three vertical firebox sides joined at edges of each vertical firebox side, a fourth vertical firebox side corresponding to the single fixed size air inlet at the lower portion of the first vertical oven side, the volumetric dimension of the first enclosed interior region being larger than the volumetric dimension of the second enclosed interior region, the offset firebox having a second opening at the top of the second enclosed interior region over which a removable grill is placed, the fourth vertical firebox side of the offset firebox providing the single fixed size air inlet through which airflow travels from outside, through the removable grill, into the second enclosed interior region, through the single fixed size air inlet, and into the first enclosed interior region of the oven; and
    an oven lid having a second slide mechanism, coupled to edges of at least two of the four vertical oven sides, to enable the oven lid to slide horizontally across the first opening at the top of the first enclosed interior region to produce a variable size opening of any desired size at the top of the oven, the desired size being changeable through a horizontal sliding motion of the oven lid, the single action of opening the oven lid causing: 1) an increase in the flow of heated air from the offset firebox into the oven through the single fixed size air inlet, 2) an increase in the oven temperature, 3) a redirection of flames from the offset firebox into the oven through the single fixed size air inlet, and 4) a decrease in the temperature of the removable grill,
    wherein the oven lid includes an adjustable vent opening that can be opened or closed independently of a position of the lid, and the offset firebox includes an adjustable vent opening that can be opened or closed.

2. The apparatus as claimed in claim 1 wherein the closing of the oven lid causing a decrease in the flow of heated air from the firebox into the oven.

3. The apparatus as claimed in claim 1 wherein the oven includes rack supports therein to support one or more removable grills, grates, or racks in the interior enclosure of the oven.

4. The apparatus as claimed in claim 1 wherein the oven includes rack supports therein to support one or more removable hangars for hanging food items in the in the interior enclosure of the oven.

5. The apparatus as claimed in claim 1 wherein the firebox further including a grill cover to cover the removable grill and firebox.

6. The apparatus as claimed in claim 1 including wheels or rollers to facilitate movement of the apparatus.

7. The apparatus as claimed in claim 1 including a foldable utility shelf.

\* \* \* \* \*